(12) United States Patent
Hicks

(10) Patent No.: US 11,146,584 B1
(45) Date of Patent: Oct. 12, 2021

(54) METHODS, APPARATUSES, SYSTEMS AND DEVICES FOR NETWORK SECURITY

(71) Applicant: 5TH COLUMN, LLC, Chicago, IL (US)

(72) Inventor: Raymond Hicks, Chicago, IL (US)

(73) Assignee: 5thColumn LLC, Chicago, IL (US)

( * ) Notice: Subject to any disclaimer, the term of this patent is extended or adjusted under 35 U.S.C. 154(b) by 242 days.

(21) Appl. No.: 16/543,207

(22) Filed: Aug. 16, 2019

Related U.S. Application Data

(60) Provisional application No. 62/765,057, filed on Aug. 16, 2018.

(51) Int. Cl.
*H04L 29/06* (2006.01)

(52) U.S. Cl.
CPC .......... *H04L 63/1433* (2013.01); *H04L 63/08* (2013.01)

(58) Field of Classification Search
CPC ............................ H04L 63/1433; H04L 63/08
USPC .......................................................... 726/25
See application file for complete search history.

(56) References Cited

U.S. PATENT DOCUMENTS

| | | | | |
|---|---|---|---|---|
| 7,934,253 | B2 * | 4/2011 | Overcash | G06F 21/55 726/22 |
| 10,536,478 | B2 * | 1/2020 | Kirti | H04L 63/1416 |
| 2008/0034425 | A1 * | 2/2008 | Overcash | H04L 63/1425 726/22 |
| 2012/0304253 | A1 * | 11/2012 | Newman | G06Q 20/4016 726/1 |
| 2014/0207486 | A1 * | 7/2014 | Carty | G06Q 10/10 705/2 |
| 2016/0212166 | A1 * | 7/2016 | Henry | G06F 21/604 |
| 2017/0034700 | A1 * | 2/2017 | Cohen | H04L 9/321 |
| 2017/0070361 | A1 * | 3/2017 | Sundermeyer | H04L 12/2809 |
| 2017/0270295 | A1 * | 9/2017 | Park | G06F 21/554 |
| 2017/0331839 | A1 * | 11/2017 | Park | G06F 21/57 |

* cited by examiner

*Primary Examiner* — Dant B Shaifer Harriman
(74) *Attorney, Agent, or Firm* — Garlick & Markison; Timothy W. Markison

(57) ABSTRACT

Embodiments of the present disclosure are directed to a number of systems, apparatuses, and methods for scoring, rating, the cyber-security of a network, and the configuration, control, and remediation, thereof. Accordingly, in some embodiments, a network security evaluation method is provided which may comprise operating an investigatory container (IC) with access to a first network (FN), and retrieving first data by the IC from a source external to the FN. The first data can correspond to at least one of an inventory of security devices provided on the FN, plug-in module information for each security device provided on the FN, each plug-in module configured to allow the IC to communicate with a respective security device of the FN, and login information associated with each security device of the FN. The method can also include logging into each security device of the FN via a respective plug-in using the retrieved, respective login information, analyzing each security device so as to obtain security data of the FN related to a plurality of network elements, and determining whether the security data meets or exceeds a minimum-viable-data (MVD) for the FN, the MVD corresponding to an indication that the FN provides effective risk management. Upon confirmation, for example, at least one of a score and rating of the cyber-security of the network can be determined.

26 Claims, 8 Drawing Sheets

US 11,146,584 B1

METHODS, APPARATUSES, SYSTEMS AND DEVICES FOR NETWORK SECURITY

RELATED APPLICATIONS

This application claims benefit of and priority to U.S. provisional patent application No. 62/765,057, filed Aug. 16, 2018, entitled, "Methods, Apparatuses, Systems and Devices for Network Security," the entire disclosure of which is herein incorporated by reference.

BACKGROUND

Data security (which can be referred to as "cyber security") is very important in today's data-driven world. It seems that not a month goes by that the public is not informed of another data breach in which consumer or business entity's financial and/or personal data has been obtained by a hacker from a reputable company (e.g., Experian, Visa, and the like). Accordingly, because of such data breaches, 60% of small businesses go out of business within six months thereafter.

While many companies invest in cybersecurity technologies to help stem the tide of such breaches, measuring the effectiveness of such technologies is difficult. Moreover, a majority of companies, especially small businesses:
- don't know where their sensitive data is located, nor how to secure it;
- fail to communicate effectively with business stakeholders or include them in cybersecurity investment decisions;
- don't fully measure whether their disaster recovery will work as planned; and
- never measure the success of security training investments.

Accordingly, there is a need for companies to better manage and determine how well their data and networks are protected.

SUMMARY OF SOME OF THE EMBODIMENTS

Embodiments of the present disclosure relate to security of computer networks, and in particular, methods, apparatuses, and systems for monitoring at least one of the security devices and security protocols of a network, and in some embodiments, determining at least one of a security score for the network, and a security rating of the network.

Accordingly, in some embodiments, a network security evaluation method is provided and may comprise operating an investigatory container (IC) with access to a first network (FN), and retrieving first data by the IC from a source external to the FN. The first data can correspond to at least one of an inventory of security devices provided on the FN, plug-in module information for each security device provided on the FN, each plug-in module configured to allow the IC to communicate with a respective security device of the FN, and login information associated with each security device of the FN. The method can also include logging into each security device of the FN via a respective plug-in using the retrieved, respective login information, analyzing each security device so as to obtain security data of the FN related to a plurality of network elements, and determining whether the security data meets or exceeds a minimum-viable-data (MVD) for the FN, the MVD corresponding to an indication that the FN provides effective risk management.

Such embodiments can include one and/or another (and in some embodiments, a plurality of, and in some embodiments, all of) the following additional features, functionality, steps, structure, or clarifications, yielding yet further embodiments of the present disclosure (any combination of features corresponds to an embodiment):

- determining at least one of a security score (S-C) for the FN based upon at least the security data, and a security rating (S-R) for the FN based upon at least the security data;
- the external source comprises a third-party server (TPS) of a security monitoring system (SMS);
  - security data can be sent to the TPS, and/or the TPS conducts at least the step of determining;
- the security data includes information related to at least one of one or more security risks, one or more security or network deficiencies, compliance with at least one standard, configuration, one or more anomalies, and one or more security alerts;
- the IC can be configured to normalize the security data;
- the IC organizes one or more containers, each for a respective plug-in;
- each plugin interfaces with a respective security device;
- the IC can be configured for remote management;
- adjusting a configuration of one or more of the security devices via the plug-in;
- adjusting the configuration comprises at least one of: providing a firewall, adding or removing a network ACL and/or rule, disabling at least one of one or more users, groups, and devices, modifying authorization and/or access for at least one of one or more users, groups, and devices, patching a vulnerability, and applying at least one of a software and firmware update;
- at least one of the identification of each security device of the FN, login information corresponding to each security device, security data of the FN, S-Cs for the FN, and S-Rs for the FN, can be stored in a vault or via a block-chain, in some embodiments, the block-chain can be used to store S-Cs and S-Rs only;
- the vault can be provided on a secure third party network;
- communications between at least one of the IC and FN, and at least one of the external source, TPS and SMS can be via the internet;
- accessing at least one of the security data of the FN, S-Cs for the FN, and S-Rs for the FN, via a mobile application operating on a mobile device;
- the SMS stores at least one of the identification of each security device of the FN, login information corresponding to each security device, security data of the FN, S-Cs for the FN, and S-Rs for the FN;
- the IC includes an orchestrator, where the orchestrator can be configured to at least one of: retrieving the first data, scheduling and/or lifecycle of one or more plug-ins, launching, starting, stopping, and organization of one or more plug-ins, such that the one or more plug-ins self-configure so as to interact with a corresponding tool or service;
- each plug-in can comprise an integrator for a corresponding tool or service configured for at least one of collecting data and remediating an issue;
- providing a file-system location to each of the plug-ins, where the file-system location can be provided to each plug-in via the orchestrator, the file system location corresponds to a location upon which each plug-in saves datasets;

and

- data-pushing, which can comprise monitoring for and responding to new dataset files for saving on file system location (which can also be referred to as a volume mount) by each of the plug-ins.

In some embodiments, a network security evaluation method is provided and comprises operating an investigatory container (IC) with access to a first network (FN), where the IC can be configured for at least one of communicating and interrogating security devices of the FN, and remote management of the operation of the IC. The method can also include establishing, by the IC, communications with a third party server (TPS) of a security monitoring system (SMS) external to the FN, and retrieving, by the IC from the TPS (SMS) at least one of plug-in module information for interfacing with each security device provided on the FN. Each plug-in module can be configured to allow the IC to communicate with a respective security device of the FN, and login information associated with each security device of the FN. The method can also include any (or several or all) of: organizing, by the IC, one or more plug-in containers each for a respective security device, logging into each security device of the FN, via a respective plug-in using the retrieved, respective login information, and analyzing each security device so as to obtain security data of the FN related to a plurality of network elements. The security data can also include any security information related to at least one of: one or more security risks, one or more security or network deficiencies, compliance with at least one standard, configuration, one or more anomalies, and one or more security alerts. The method can also include any (or several or all) of: normalizing the security data, forwarding the normalized security data of the FN to the SMS either via the TPS or another SMS device, determining, by the SMS, whether the security data meets or exceeds a minimum-viable-data (MVD) for the FN, the MVD corresponding to an indication that the FN provides effective risk management, and optionally determining, by the SMS, at least one of a security score (S-C) for the FN based upon at least the security data, and a security rating (S-R) for the FN based upon at least the security data, optionally adjusting the configuration of one or more of the security devices via the plug-in to optionally improve security of the FN. Adjusting can include at least one of: providing a firewall, adding or removing a network ACL and/or rule, disabling at least one of one or more users, groups, and devices, modifying authorization and/or access for at least one of one or more users, groups, and devices, patching a vulnerability, and applying at least one of a software and firmware update. The method can still yet further include optionally determining one or more recommendations on improving at least one of the S-C and S-R of the FN based on at least one of the security data, number and type of current security devices of the FN and corresponding one or more toolsets thereof.

In some embodiments, a network security evaluation system is provided, and can include an investigatory container (IC) comprising IC software code (ICSC) operating on a server with access to a first network (FN), wherein the ICSC can be configured to cause the IC to retrieve first data from a source external to the FN corresponding to at least one of: an inventory of security devices provided on the FN, plug-in module information for each security device provided on the FN, each plug-in module configured to allow the IC to communicate with a respective security device of the FN, and login information associated with each security device of the FN. The system can also include a plurality of plug-in containers for which the plug-in module information corresponds thereto, each plug-in container comprising respective plug-in software (PIS) for interacting with a respective security device of the FN, where at least one of the ICSC and respective PIS are configured to cause at least one of the IC and each of the respective plug-ins to: log into each security device of the FN using respective login information, and analyze each security device so as to obtain security data of the FN related to a plurality of network elements.

Such embodiments can include one and/or another (and in some embodiments, a plurality of, and in some embodiments, all of) the following additional features, functionality, steps, structure, or clarifications, yielding yet further embodiments of the present disclosure (any combination of features corresponds to an embodiment):

at least one second server having second software code (SSC) operating thereon configured to cause the second server to at least one of determining whether the security data meets or exceeds a minimum-viable-data (MVD) for the FN, the MVD corresponding to an indication that the FN provides effective risk management, and determine at least one of a security score (S-C) for the FN based upon at least the security data, and a security rating (S-R) for the FN based upon at least the security data;

the external source comprises a third-party server (TPS) of a security monitoring system (SMS), where the TPS includes TPS software code (TPSSC) operating thereon configured to cause the TPS to at least one of:

determine whether the security data meets or exceeds a minimum-viable-data (MVD) for the FN, the MVD corresponding to an indication that the FN provides effective risk management, and determine at least one of a security score (S-C) for the FN based upon at least the security data, and a security rating (S-R) for the FN based upon at least the security data;

the ICSC can be configured to cause the IC to send security data to the TPS;

the security data includes information related to at least one of: one or more security risks, one or more security or network deficiencies, compliance with at least one standard, configuration, one or more anomalies, and one or more security alerts;

the ICSC can be configured to normalize the security data;

the ICSC can be configured to cause the IC to organize the plurality of plug-in containers;

the ICSC of the IC is configured to cause the IC to be remotely managed;

the ICSC is further configured to cause the IC to adjust a configuration of one or more of the security devices via the plug-in, such that adjusting the configuration can comprise at least one of: providing a firewall, adding or removing a network ACL and/or rule, disabling at least one of one or more users, groups, and devices, modifying authorization and/or access for at least one of one or more users, groups, and devices, patching a vulnerability, and applying at least one of a software and firmware update;

a vault can be configured to store at least one of an identification of each security device of the FN, login information corresponding to each security device, security data of the FN, S-Cs for the FN, and S-Rs for the FN, where the vault can be configured on a secure third party network;

at least one of S-Cs and S-Rs for the FN can be stored via a block-chain;

communications between the at least one of the IC and FN, and at least one of the external source, second server, TPS, and SMS can be via the internet;

at least one of the IC, at least one external source, second party server, TPS, and SMS are configured to communicate with a mobile application operating on a mobile device;

the SMS stores at least one of the identification of each security device of the FN, login information corresponding to each security device, security data of the FN, S-Cs for the FN, and S-Rs for the FN;

at least a portion of the ICSC can be configured to perform as an orchestrator;

the orchestrator can be configured to at least one of: retrieving the first data, scheduling and/or lifecycle of one or more plug-ins, launching, starting, stopping, and organization of one or more plug-ins, such that the one or more plug-ins self-configure so as to interact with a corresponding tool or service;

each plug-in container can comprise an integrator for a corresponding tool or service configured for at least one of collecting data and remediating an issue;

at least one of the ICSC, SSC, TPSSC, and SMS can be configured to provide a file-system location to each of the plug-ins;

at least a portion of the ICSC can be configured as a data-pusher;

the data-pusher can be configured to monitor and respond to new dataset files for saving on the file system location by each of the plug-ins;

at least a portion of the ICSC can be s as the file system location; and the plurality of plug-ins can be configured as a container engine API (e.g., Docker, Inc.).

Various embodiments of the present disclosure include one and/or another of the following advantages:

near real time ingestion, aggregation, and/or remediation;

plugins, according to some embodiments, enable quick and easy addition, replacement or upgrades of devices/tool deployed in an environment;

consolidation of security data under a single platform, which (according to some embodiments):
  facilitates a unified view,
  provides highlighting,
  the prioritization of information,
  improves focus,
  reduces context switching that generally occurs when working with numerous and various devices/tools deployed in a network;

consistent and/or automated generation of:
  key-performance-indicators (KPIs),
  reports, and
  scores S-Rs and/or S-Cs provide an independent and unbiased mechanism for internal and external use to track, share and/or validate an environments security posture, aligned to industry standards (e.g. NIST) and best practices, and accessible from anywhere, website, mobile app, API, etc.

These and other embodiments of the present disclosure will become even more clear with reference to the drawings, a brief description of which follows, as well as additional description for at least some of the embodiments thereafter.

FURTHER DESCRIPTION OF SOME OF THE EMBODIMENTS

These and other embodiments of the present disclosure will become even clearer with reference to the figures and additional description which follows. In some embodiments, methods, apparatuses and systems are presented which can be configured to provide at least one of:

a cyber-security score (similar to a FICO score, albeit for cyber security), which can be a letter and/or numerical score regarding the cyber-security strength of an individual computer network of an entity/customer (or components thereof), which can be configured as an internal score for the entity, or an external score to share with others;

a cyber-security rating for an entity in general, which takes into account all aspects of the entities computer systems, networks and the like;

subscription service to provide your scores to third parties requesting the same;

at least one of a continuous cyber-security auditing and remediation platform; and decision functionality/engine to at least one of automatically, manually setup scenarios to change a score/rating.

In some embodiments, scoring and/or rating (depending upon the embodiment) is calculated by evaluating the security data of the FN against, for example, one or more the following: compliance to standards frameworks, industry best practices, performance compared to competitors/peers, etc.; and weighting the same, for example, by the potential risk it may introduce.

Figure 1:
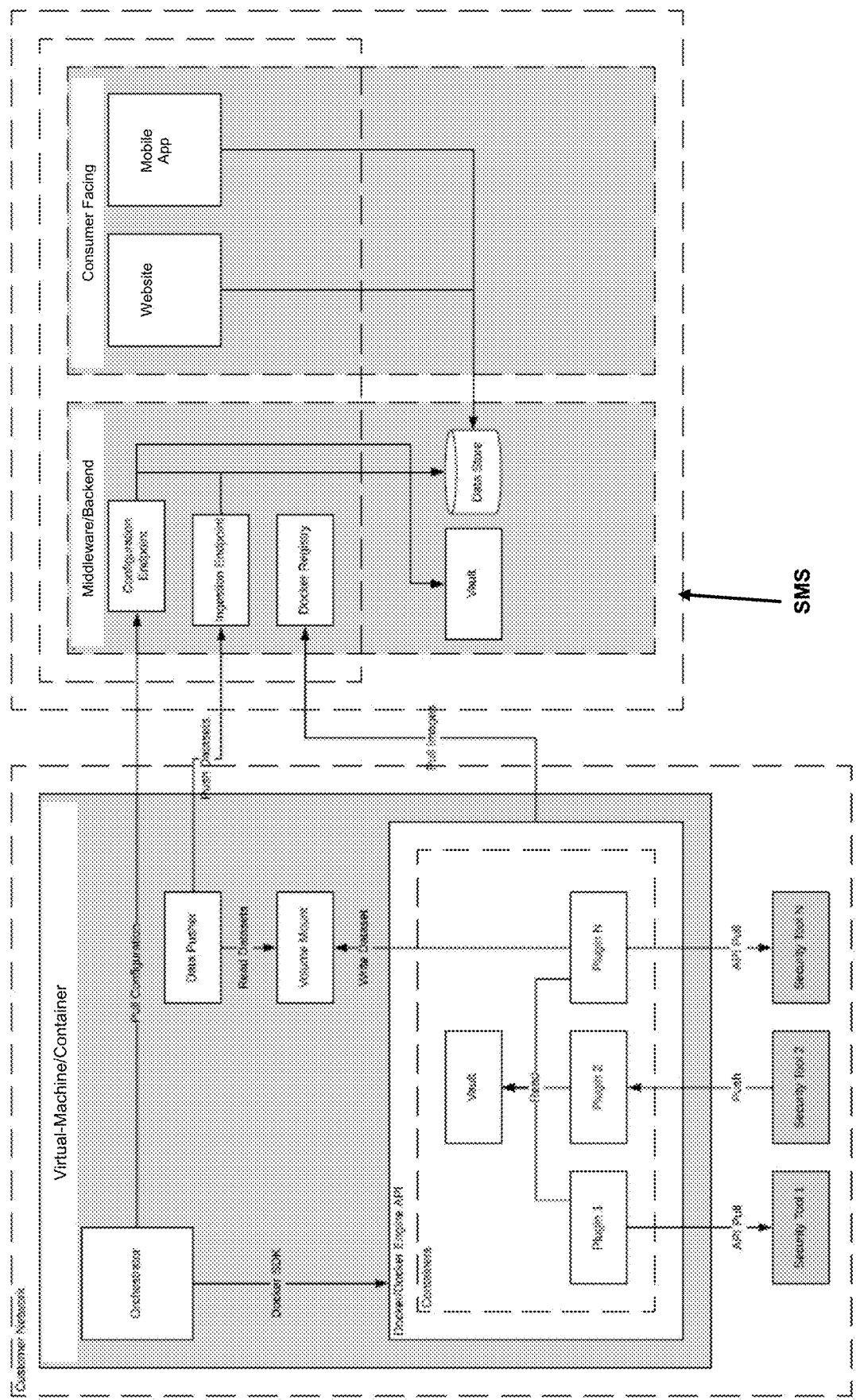
FIG. 1 illustrates an overview of a system for performing methods recited herein according to some embodiments of the present disclosure.

FIG. 1 illustrates some embodiments of the present disclosure, directed to methods, apparatuses, devices and systems for entity/customer network security evaluation and the like. As shown, in some embodiments, a network security evaluation system is provided for at least one of evaluating, a cyber-security score/rating, cyber-security auditing and remediation (which can be continuous), and decision functionality/engine (e.g., to at least one of automatically, manually setup scenarios to change a score/rating; see above). Accordingly, a virtual machine or investigatory container (IC) comprising IC software code (ICSC) is provided, operating on a server of a network of an entity, for example (or with access to the network of an entity). The ICSC can be, in some embodiments, configured to cause the IC to retrieve first data from a source external to the network. The source can correspond to a third-party security monitoring service/system (SMS), or other/second server, which can communicate with the entity network via, for example, the internet. The first data can comprise, for example, at least one of an inventory of security devices provided on the entity network, plug-in module information for each security device provided on the entity, as well as login information for logging into each security device. Accordingly, and as also shown, the system can include a Docker/Docker-engine API (by Docker, Inc.), comprising a plurality of plug-in modules (to which the above-noted information corresponds), each configured to allow the IC to communicate with a respective security device of the entity network via a respective plug-in. The plurality of plug-in can be configured as containers within the IC (as shown in FIG. 1). In various other embodiments of the present disclosure, a file-system location can be provided to each of the plug-ins (e.g., by the IC).

In some embodiments, at least a portion of the ICSC is configured to perform as an orchestrator, which manages one or more of retrieving the data (e.g., from the SMS or components of the entity network), scheduling and/or lifecycle of one or more plug-ins, launching, starting, stopping, and organization of one or more plug-ins, such that the one or more plug-ins self-configure so as to interact with a corresponding tool or service. Additionally, in some embodiments, a portion of the ICSC can be configured as a data-pusher, which can be configured to monitor and respond to dataset files (e.g., new dataset files) for saving on a file system location (also referred to as a volume mount) by each of the plug-ins (note, a portion of the ICSC can be configured as the file system location).

Each plug-in/container including respective plug-in software (PIS) for interacting with a respective security device of the entity network. In some embodiments, at least one of the ICSC and respective PIS of each plug-in can be configured to cause either or both of at least one of the IC and the plurality of plug-ins (and in some embodiments, at least one of the plug-ins, or several), to log into each security device of the entity network (using respective login information). Thereafter, the logged-in security devices are analyzed (by either the IC directly, or the associated plug-in) so as to obtain security data of the entity network related to a plurality of network elements. In some embodiments, each plug-in container can be configured with an integrator for a corresponding tool or service, for at least one of collecting data and remediating an issue.

In some embodiments, the SMS corresponds to or includes a third-party server (TPS). The TPS can be configured to include TPS software code (TPSSC) operating thereon for causing the TPS to at least one of determining whether the security data meets or exceeds a minimum-viable-data (MVD) for the entity network, and determine at least one of a security score (S-C) for the entity network based upon at least the security data, and a security rating (S-R) for the entity network based upon at least the security data. The MVD corresponds to an indication that the FN provides effective risk management. The ICSC can be configured to cause the IC to forward/send security data to the TPS. The security data can include any information, including information related to at least one of one or more security risks, one or more security or network deficiencies, compliance with at least one standard, configuration, one or more anomalies, and one or more security alerts. Such data may be normalized (e.g., restructured so as to reduce data redundancy).

In some embodiments, the MVD is an indication of whether a given security tool is configured correctly and/or optimally and/or the completeness of associated data. For example, a vulnerability scanner can be deployed, and yet never be operated or scheduled to scan on a recurring basis. In another example, an inventory tool may have an entry for all assets, but does not identify what use the assets are for or by whom. In such a scenario, a server may exist but it may not be known whether the server has been recently provisioned or responsible for operating business critical applications, or is in scope for various compliance or regulatory requirements (e.g., HIPPA, PCI, SOX, etc.).

In some embodiments, the IC can be configured so as to be remotely managed either via the SMS, a mobile application (e.g., communications via any wireless protocol), or any other remote server having an application thereon for interacting/controlling the IC and processes. To this end, the IC (i.e., the ICSC) can be configured to adjust a configuration of one or more of the security devices via the plug-in, and can also adjust the IC functionality. For example, adjusting the configuration can include at least one of:

providing a firewall,
adding or removing a network ACL and/or rule,
disabling at least one of one or more users, groups, and devices,
modifying authorization and/or access for at least one of one or more users, groups, and devices, patching a vulnerability, and
applying at least one of a software and firmware update.

In some embodiments, a vault can be included (i.e., access to) to the entity network, SMS, or other third party (or all). The vault can be configured to store at least one of an identification of each security device of the entity network, login information corresponding to each security device, security data of the entity network, S-Cs for the entity network, and S-Rs for the entity network. In some embodiments, at least one of S-Cs and S-Rs (as well as other information) can be stored via a block-chain.

Figure 2:
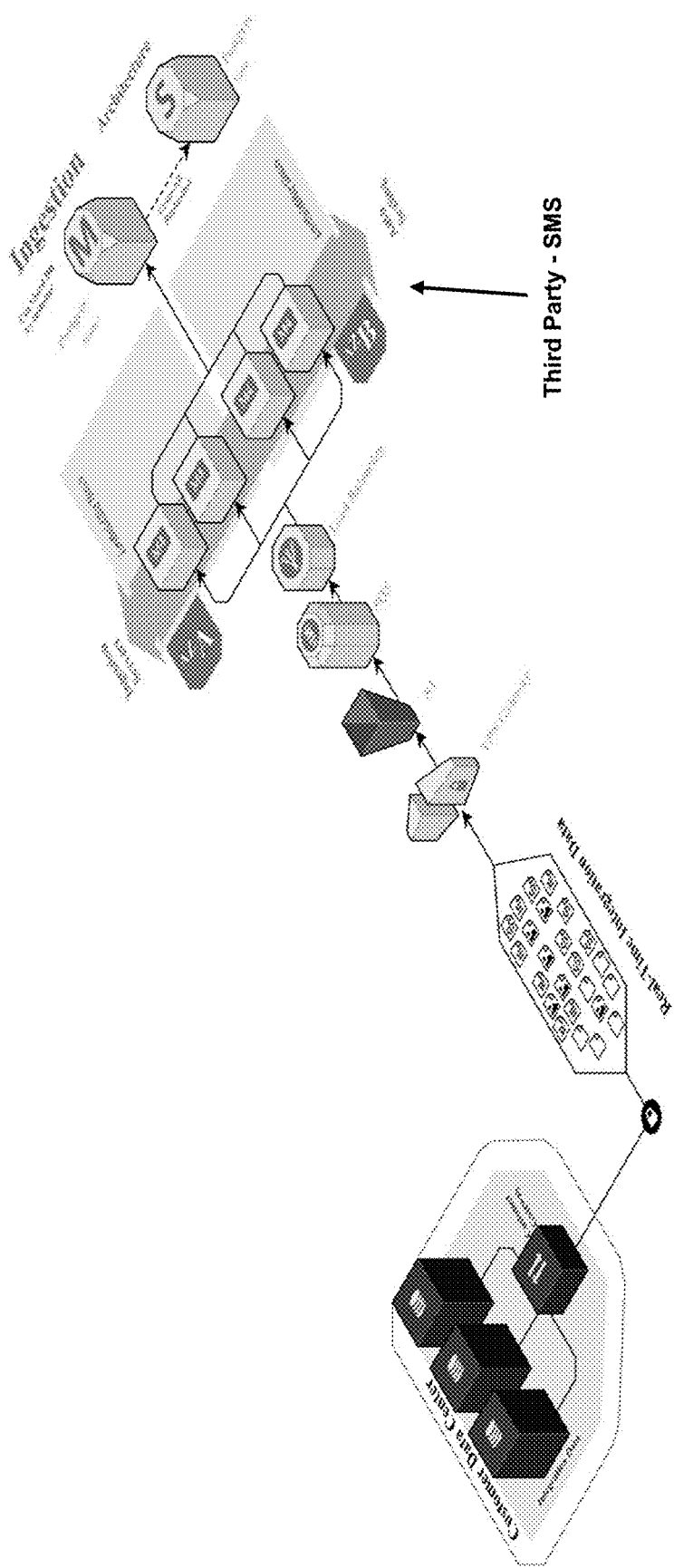
FIG. 2 illustrates an exemplary ingestion architecture for aspects of the monitoring systems, apparatuses, devices and methods, according to some embodiments of the present disclosure.

FIG. 2 illustrates an exemplary ingestion architecture for aspects of the monitoring systems, apparatuses, devices and methods disclosed herein, illustrating, for example, an overview of real-time integration data between a Customer Data Center and load-balanced, ingestion servers (which can be auto-scaled based on data/management requirements) of the third party SMS, via a virtual-private-network (VPN). Accordingly, such architecture can include, for example, a VPN gateway, storage functionality (S3), queue servicing functionality (SQS), as well as master-slave replication functionality ("M"/"S").

Figure 3:
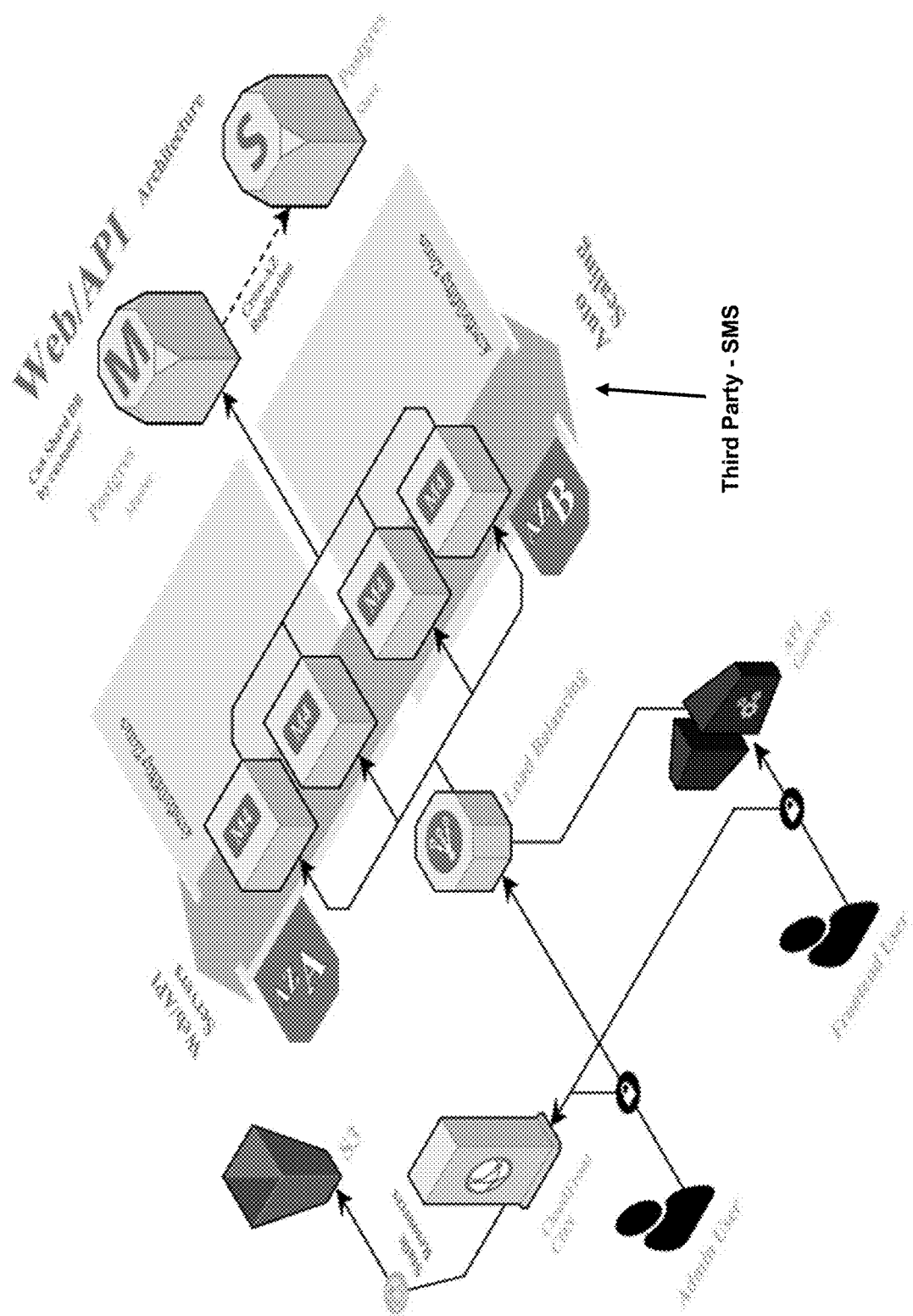
FIG. 3 illustrates an exemplary web/API architecture for aspects of the monitoring systems, apparatuses, devices and methods, according to some embodiments of the present disclosure.

FIG. 3 illustrates an exemplary web/API architecture for aspects of the monitoring systems, apparatuses, devices and methods disclosed herein, for users and administrators (for example), which can include content-delivery network functionality (CDN), and an API gateway, for accessing, the ingestion servers (e.g., see also, FIG. 2).

FIGS. 4-7 illustrate screenshots of a user-interface (GUI) for an application for at least one of monitoring, configuring, and controlling at least some of the various attributes of some of the disclosed embodiments, which can be interacted with via an input device such as a mouse, keyboard or touchscreen.

Figure 4:
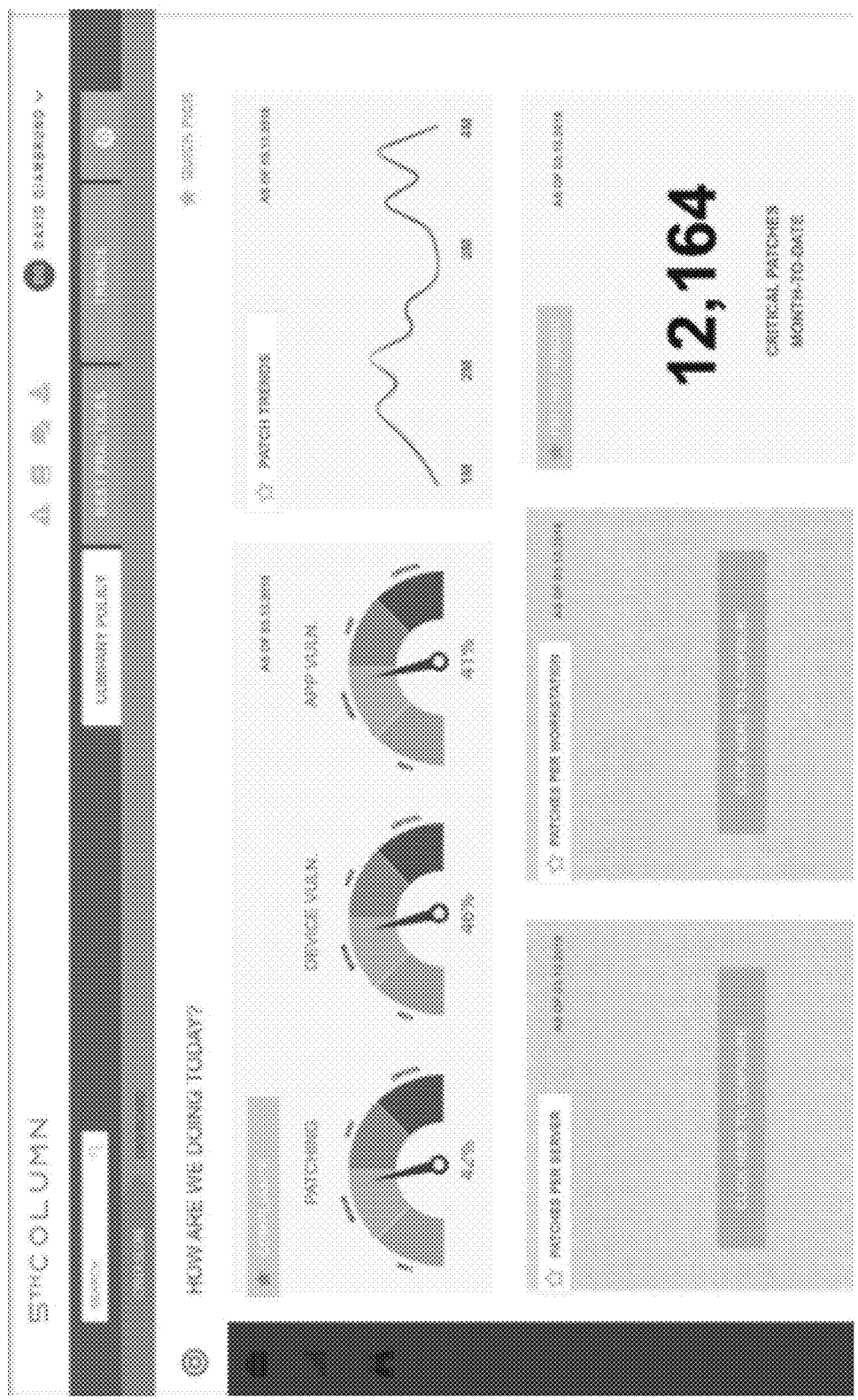
FIG. 4 illustrates one screenshot of a user-interface (GUI), Security Dashboard I, for an application for at least one of monitoring, configuring, and controlling at least some of the various attributes of some of the embodiments of the present disclosure.

Accordingly, FIG. 4 illustrates a screenshot of such a GUI (security dashboard I), illustrating security compliance for an entity issued by the SMS, for example. The screenshot can include a first section and indicators illustrating an indicator for security patching (a), an indicator for security device vulnerability (b), and application vulnerability (c). The indicators may include a color scale and percentage of compliance or score—the lower the percentage, the better the security score (e.g., green/low percentage indicating low risk, and various other colors, yellow, orange, red, and associated increased percentage indicating increased risk). Other sections of the compliance GUI can include an area for configuring servers, and configuring workstations, while also illustrating the number of software-security patches per server and per workstation. Another section illustrates trends in the security patches, as well as yet another section, displaying the number of patches per a predetermined time period (e.g., month-to-date).

Figure 5:
FIG. 5 illustrates one screenshot of a user-interface (GUI), Security Dashboard II, for an application for at least one of monitoring, configuring, and controlling at least some of the various attributes of some of the embodiments of the present disclosure.

FIG. 5 illustrates a screenshot of a GUI (security dashboard II), illustrating a first tab (Risk Score) of a security review of an entity, i.e., a "Cyber Risk Score" for an entity that is issued by the SMS, for example. Sections of the GUI include an entity's Cyber Risk Score, an Industry Cyber Risk Score, and overviews of each (for example), including "Hygiene" and "Detect." Additionally, the GUI can include "Point and Time Overview" scoring in a color coded graph over a predetermined period of time (days, weeks, months, years).

Figure 6:
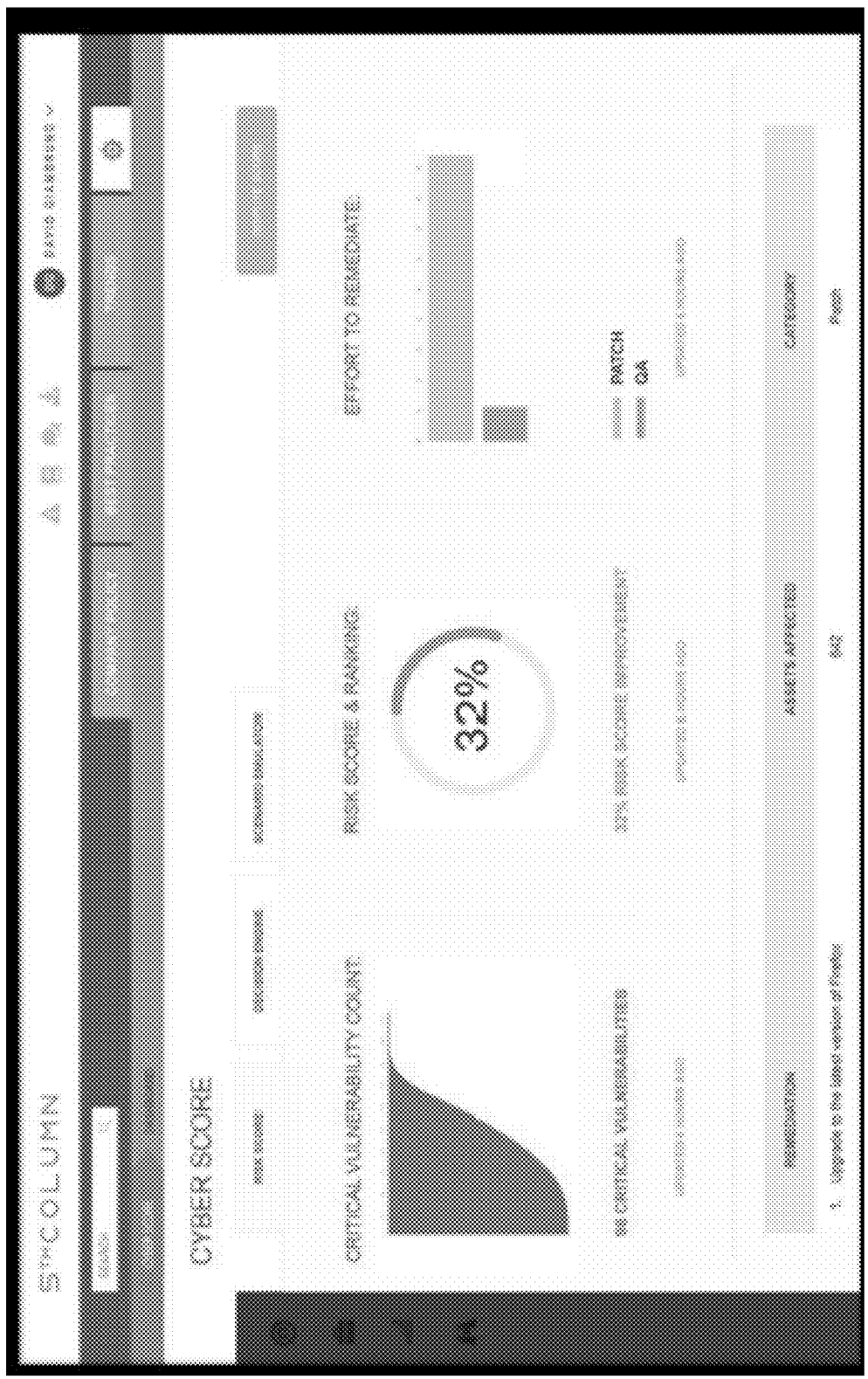
FIG. 6 illustrates one screenshot of a user-interface (GUI), Security Dashboard III, for an application for at least one of monitoring, configuring, and controlling at least some of the various attributes of some of the embodiments of the present disclosure.

FIG. 6 illustrates a screenshot of a GUI (security dashboard III), illustrating a second tab (Decision Engine) of a security review of an entity by the SMS, for example. Sections of the GUI include an entity's Critical Vulnerability Count, which can be a number of security vulnerabilities assessed by the SMS for the entity (the depiction can be a chart and may be color coded). Another section can include a Risk Score and Ranking, and additionally, a section illustrating the effort required to improve the security score (as illustrated, a number of security patches are required to increase security and score).

Figure 7:
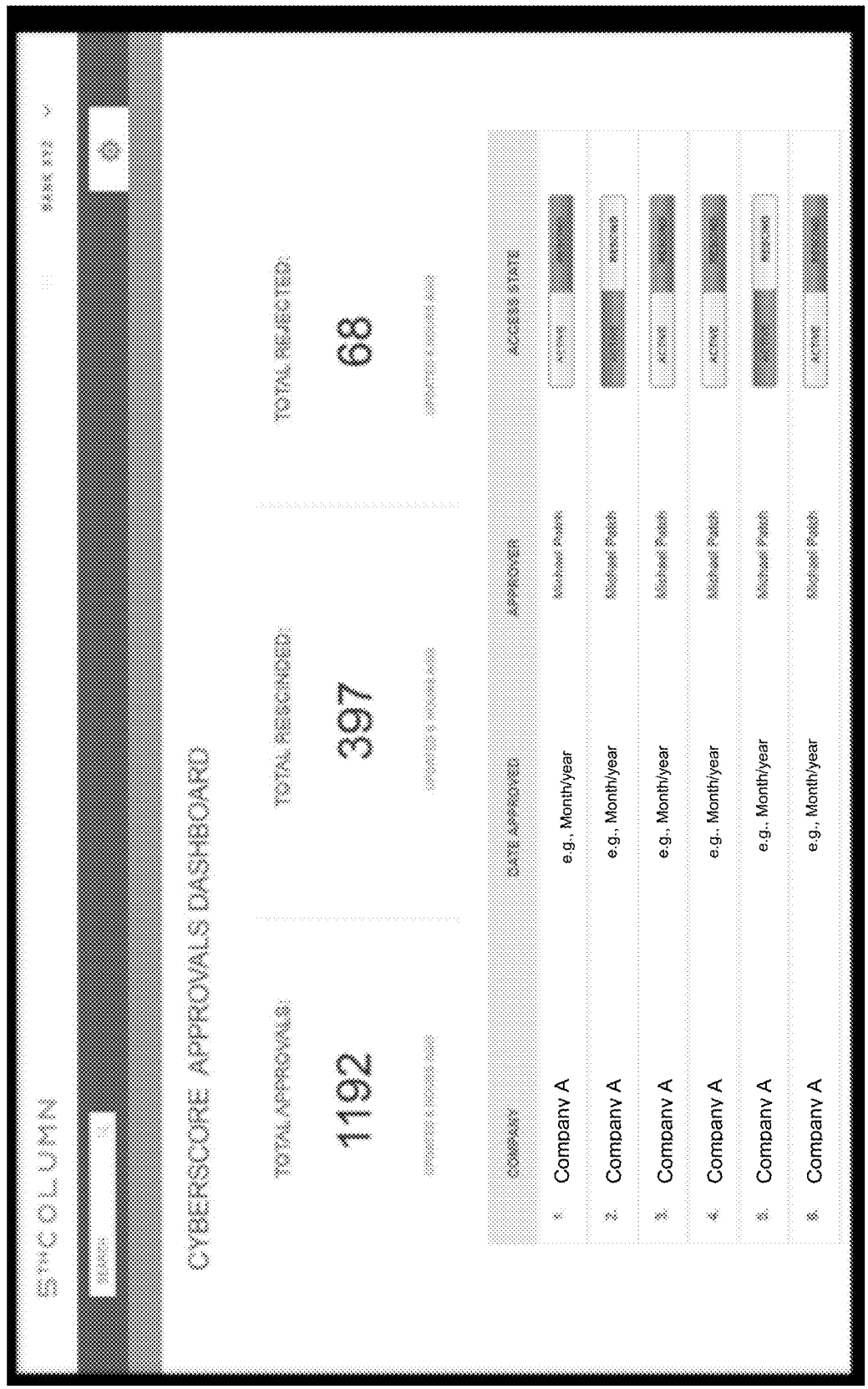
FIG. 7 illustrates one screenshot of a user-interface (GUI), Security Dashboard IV, for an application for at least one of monitoring, configuring, and controlling at least some of the various attributes of some of the embodiments of the present disclosure.

FIG. 7 illustrates a screenshot of a GUI (security dashboard IV), illustrating a cyberscore approval dashboard, which summarizes the number of security patch approvals, and those approvals which have been rescinded and/or rejected. A listing of each approval can be scrolled by a user of the GUI to see the entity name, the approval date, the person approving the particular patch, as well as an access status (which may be color coded), which can include functionality for making such patches active, or rescinding such patches.

Figure 8:
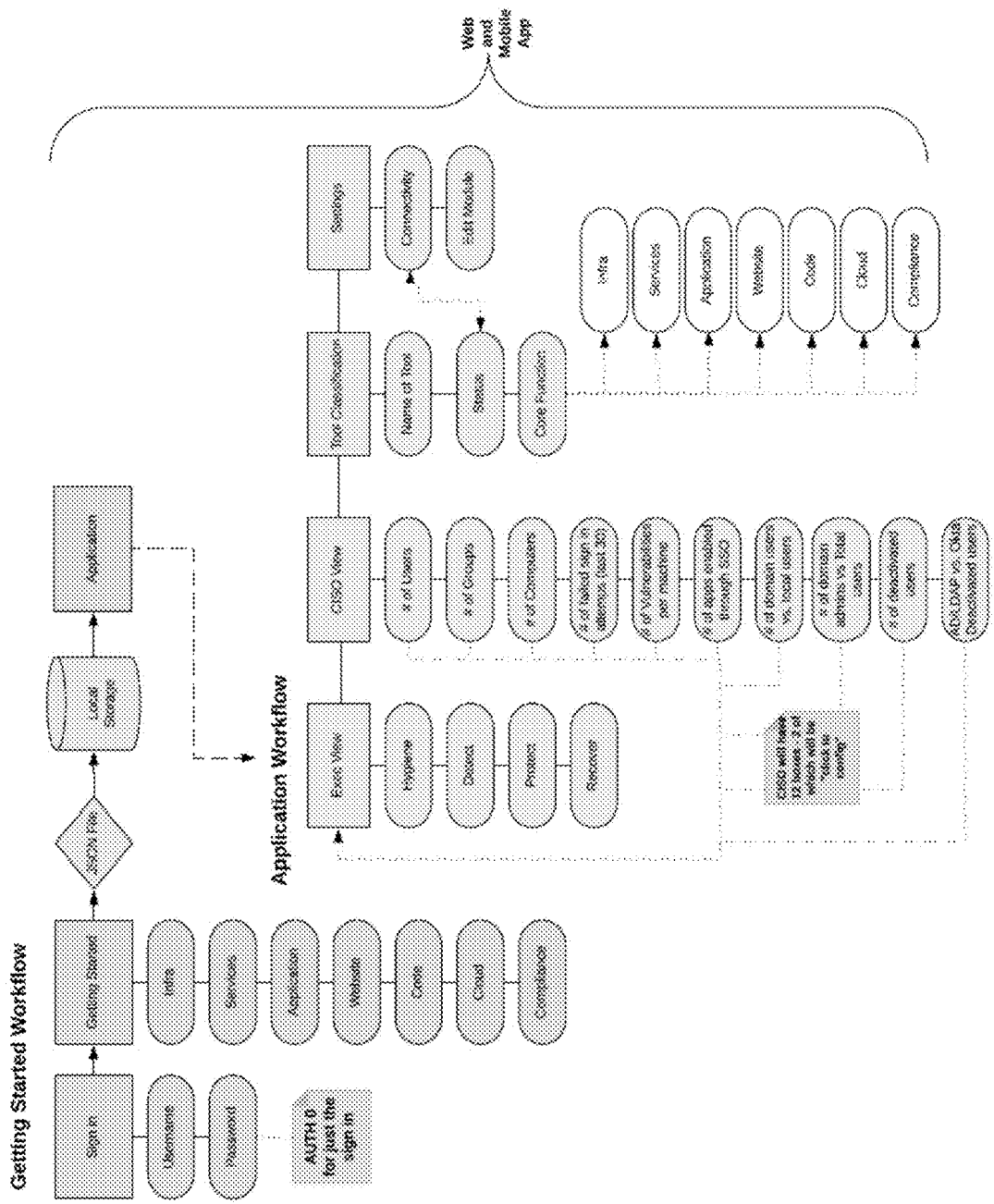
FIG. 8 illustrates an exemplary flowchart for accessing, interacting, and/or configuring various security dashboards via an access method/device, according to some embodiments of the present disclosure.

FIG. 8 illustrates an exemplary flowchart for accessing, interacting, and/or configuring the various dashboards, e.g., via at least one of a mobile application, a desktop application, one or more webpages of an internet portal. Such a GUI(s) can be interacted with via an input device such as a mouse, keyboard, or touchscreen (for example).

While various inventive embodiments have been described and illustrated herein, those of ordinary skill in the art will readily envision a variety of other means, steps, and/or structures/code for performing the functionality disclosed and/or obtaining the results and/or one or more of the advantages and/or objects described herein, and each of such variations and/or modifications is deemed to be within the scope of the inventive embodiments described herein. More generally, those skilled in the art will readily appreciate that all parameters and configurations described herein are meant to be exemplary and that the actual parameters and configurations will depend upon the specific application or applications for which the inventive teachings is/are used. Those skilled in the art will recognize, or be able to ascertain using no more than routine experimentation, many equivalents to the specific inventive embodiments described herein. It is therefore to be understood that the foregoing embodiments are presented by way of example only and that, within the scope of any claims supported by this disclosure and equivalents thereto, inventive embodiments may be practiced otherwise than as specifically described and claimed. Inventive embodiments of the present disclosure are directed to each individual feature, system, device, step, code, functionality and/or method described herein. In addition, any combination of two or more such features, systems, devices, steps, code, functionalities, and/or methods, if such features, systems, devices, steps, code, functionalities, and/or methods are not mutually inconsistent, is included within the inventive scope of the present disclosure. Further embodiments may be patentable over prior art by specifically lacking one or more features/functionality (i.e., claims directed to such embodiments may include one or more negative limitations to distinguish such claims from prior art).

The above-described embodiments of the present disclosure can be implemented in any of numerous ways. For example, some embodiments may be implemented using hardware, software or a combination thereof. When any aspect of an embodiment is implemented at least in part in software, the software code can be executed on any suitable processor or collection of processors, servers, and the like, whether provided in a single computer or distributed among multiple computers.

In this respect, various embodiments disclosed herein may be embodied at least in part as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium or non-transitory medium) encoded with one or more programs/instructions that, when executed on one or more computers or other processors, perform methods that implement the various embodiments of the technology discussed above. The computer readable medium or media can be transportable, such that the program or programs stored thereon can be loaded onto one or more different computers or other processors to implement various aspects of the present technology as discussed above.

The terms "program," "software," "code," or "software code" are used herein in a generic sense to refer to any type of computer code or set of computer-executable instructions that can be employed to program a computer or other processor to implement various aspects of the present technology as discussed above. Additionally, it should be appreciated that according to one aspect of this embodiment, one or more computer programs that when executed perform methods of the present technology need not reside on a single computer or processor, but may be distributed in a modular fashion amongst a number of different computers or processors to implement various aspects of the present technology, on and/or over a network.

Computer-executable instructions may be in many forms, such as program modules, or containers, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, as noted, various inventive concepts are embodied as one or more methods, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Any and all references to publications or other documents, including but not limited to, patents, patent applications, articles, webpages, books, etc., presented anywhere in the present application, are herein incorporated by reference in their entirety. Moreover, all definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one." The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined.

Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of" "only one of" or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is currently claimed:

1. A network security evaluation method comprising:
   operating an investigatory container (IC) with access to a first network (FN);
   retrieving first data by the IC from a source external to the FN corresponding to at least one of:
      an inventory of security devices provided on the FN;
      plug-in module information for each security device provided on the FN, each plug-in module configured to allow the IC to communicate with a respective security device of the FN; and
      login information associated with each security device of the FN;
   logging into each security device of the FN via a respective plug-in using the retrieved, respective login information;
   analyzing each security device so as to obtain security data of the FN related to a plurality of network elements; and
   determining whether the security data meets or exceeds a minimum-viable-data (MVD) for the FN, the MVD corresponding to an indication that the FN provides effective risk management.

2. The method of claim 1, further comprising determining at least one of a security score (S-C) for the FN based upon at least the security data, and a security rating (S-R) for the FN based upon at least the security data.

3. The method of claim 1, wherein the external source comprises a third-party server (TPS) of a security monitoring system (SMS).

4. The method of claim 3, wherein:
   security data is sent to the TPS, and
   the TPS conducts at least the determining step.

5. The method of claim 3, wherein the security data includes information related to at least one of:
   one or more security risks, one or more security or network deficiencies, compliance with at least one standard, configuration, one or more anomalies, and one or more security alerts.

6. The method of claim 1, wherein the IC is configured to normalize the security data.

7. The method of claim 1, wherein the IC organizes one or more containers, each for a respective plug-in.

8. The method of claim 1, wherein each plugin interfaces with a respective security device.

9. The method of claim 1, wherein the IC is configured for remote management.

10. The method of claim 1, further comprising adjusting a configuration of one or more of the security devices via the plug-in.

11. The method of claim 10, wherein adjusting the configuration comprises at least one of: providing a firewall, adding or removing a network ACL and/or rule, disabling at least one of one or more users, groups, and devices, modifying authorization and/or access for at least one of one or more users, groups, and devices, patching a vulnerability, and applying at least one of a software and firmware update.

12. The method of claim 2, wherein at least one of the identification of each security device of the FN, login information corresponding to each security device, security data of the FN, S-Cs for the FN, and S-Rs for the FN, is stored in a vault or via a block-chain.

13. The method of claim 12, wherein the vault is provided on a secure third party network.

14. The method of claim 1, wherein communications between the at least one of the IC and FN, and at least one of the external source, TPS and SMS is via the internet.

15. The method of claim 1, further comprising accessing at least one of the security data of the FN, S-Cs for the FN, and S-Rs for the FN, via a mobile application operating on a mobile device.

16. The method of claim 3, wherein the SMS stores at least one of the identification of each security device of the FN, login information corresponding to each security device, security data of the FN, S-Cs for the FN, and S-Rs for the FN.

17. The method of claim 1, wherein the IC includes an orchestrator.

18. The method of claim 17, wherein the orchestrator is configured to at least one of: retrieving the first data, scheduling and/or lifecycle of one or more plug-ins, launching, starting, stopping, and organization of one or more plug-ins, such that the one or more plug-ins self-configure so as to interact with a corresponding tool or service.

19. The method of claim 1, wherein each plug-in comprises an integrator for a corresponding tool or service configured for at least one of collecting data and remediating an issue.

20. The method of claim 1, further comprising providing a file-system location to each of the plug-ins.

21. The method of claim 20, further comprising providing a file-system location to each of the plug-ins.

22. The method of claim 21, wherein the file-system location is provided to each plug-in via the orchestrator.

23. The method of claim 20, wherein the file system location corresponds to a location upon which each plug-in saves datasets.

24. The method of claim 1, further comprising data-pushing.

25. The method of claim 24, wherein data-pushing comprises monitoring for and responding to new dataset files for saving at a file system location by each of the plug-ins.

26. A network security evaluation method comprising:
operating an investigatory container (IC) with access to a first network (FN), the IC configured for:
at least one of communicating and interrogating security devices of the FN; and
remote management of the operation of the IC;
establishing, by the IC, communications with a third party server (TPS) of a security monitoring system (SMS) external to the FN;
retrieving, by the IC from the TPS (SMS):
plug-in module information for interfacing with each security device provided on the FN, each plug-in module configured to allow the IC to communicate with a respective security device of the FN, and
login information associated with each security device of the FN;
organizing, by the IC, one or more plug-in containers each for a respective security device;
logging into each security device of the FN, via a respective plug-in using the retrieved, respective login information;
analyzing each security device so as to obtain security data of the FN related to a plurality of network elements, the security data including information related to at least one of: one or more security risks, one or more security or network deficiencies, compliance with at least one standard, configuration, one or more anomalies, and one or more security alerts;
normalizing the security data;
forwarding the normalized security data of the FN to the SMS either via the TPS or another SMS device;
determining, by the SMS, whether the security data meets or exceeds a minimum-viable-data (MVD) for the FN, the MVD corresponding to an indication that the FN provides effective risk management;
optionally determining, by the SMS, at least one of a security score (S-C) for the FN based upon at least the security data, and a security rating (S-R) for the FN based upon at least the security data;
optionally adjusting the configuration of one or more of the security devices via the plug-in to optionally improve security of the FN, where adjusting includes at least one of:
providing a firewall, adding or removing a network ACL and/or rule, disabling at least one of one or more users, groups, and devices, modifying authorization and/or access for at least one of one or more users, groups, and devices, patching a vulnerability, and applying at least one of a software and firmware update;
and
optionally determining one or more recommendations on improving at least one of the S-C and S-R of the FN based on at least one of the security data, number and type of current security devices of the FN and corresponding one or more toolsets thereof.

* * * * *